(12) United States Patent
Shen et al.

(10) Patent No.: US 10,667,131 B2
(45) Date of Patent: May 26, 2020

(54) METHOD FOR CONNECTING NETWORK ACCESS DEVICE TO WIRELESS NETWORK ACCESS POINT, NETWORK ACCESS DEVICE, AND APPLICATION SERVER

(71) Applicant: TENCENT TECHNOLOGY (SHENZHEN) COMPANY LIMITED, Shenzhen (CN)

(72) Inventors: Yan Shen, Shenzhen (CN); Zhao Luo, Shenzhen (CN); Daihua Wang, Shenzhen (CN); Bin Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 448 days.

(21) Appl. No.: 15/699,702

(22) Filed: Sep. 8, 2017

(65) Prior Publication Data
US 2017/0374551 A1 Dec. 28, 2017

Related U.S. Application Data

(63) Continuation of application No. PCT/CN2016/083974, filed on May 30, 2016.

(30) Foreign Application Priority Data

Aug. 19, 2015 (CN) .......................... 2015 1 0512991

(51) Int. Cl.
*H04W 12/06* (2009.01)
*H04L 29/06* (2006.01)
(Continued)

(52) U.S. Cl.
CPC ........... *H04W 12/06* (2013.01); *H04L 9/0822* (2013.01); *H04L 9/0891* (2013.01);
(Continued)

(58) Field of Classification Search
CPC .... H04W 12/06; H04L 9/0822; H04L 9/0891; H04L 9/3247; H04L 29/06; H04L 63/06; H04L 63/0876; H04L 63/0892
See application file for complete search history.

(56) References Cited

U.S. PATENT DOCUMENTS

| 6,640,097 B2 * | 10/2003 | Corrigan | ................. H04L 12/14 370/404 |
| 2006/0235935 A1 * | 10/2006 | Ng | .......................... H04L 29/06 709/208 |

(Continued)

FOREIGN PATENT DOCUMENTS

| CN | 101371550 A | 2/2009 |
| CN | 101998405 A | 3/2011 |

(Continued)

OTHER PUBLICATIONS

The World Intellectual Property Organization (WIPO) International Search Report for PCT/CN2016/083974 dated Aug. 24, 2016 6 Pages.

(Continued)

*Primary Examiner* — David Le
(74) *Attorney, Agent, or Firm* — Anova Law Group, PLLC

(57) ABSTRACT

A method for connecting a network access device to a wireless network access point includes: initiating an access request to a wireless network access point, wherein when detecting that the network access device is not authenticated, the wireless network access point redirects the access request to an authentication portal, the access request carrying an authentication server address; obtaining, by an application client on the network access device, an authentication parameter after obtaining authentication authorization of a user on the authentication portal; encrypting the authentication parameter by using a wireless access key;

(Continued)

initiating, according to the authentication server address, an authentication request carrying the encrypted authentication parameter to an authentication server; receiving the login address and the encrypted signature from the authentication server; accessing the login address on the authentication server; and connecting to the wireless network access point to access the Internet according to a pass-through result.

18 Claims, 10 Drawing Sheets

(51) Int. Cl.
*H04L 9/08* (2006.01)
*H04L 9/32* (2006.01)
*H04W 12/04* (2009.01)

(52) U.S. Cl.
CPC ............ *H04L 9/3247* (2013.01); *H04L 29/06* (2013.01); *H04L 63/06* (2013.01); *H04L 63/0876* (2013.01); *H04L 63/0892* (2013.01); *H04W 12/04* (2013.01); *H04L 2209/80* (2013.01)

(56) References Cited

U.S. PATENT DOCUMENTS

| 2012/0096271 | A1 | 4/2012 | Ramarathinam et al. |
| 2012/0144189 | A1* | 6/2012 | Zhong ................. H04L 63/0853 713/155 |
| 2013/0111024 | A1* | 5/2013 | Setia ....................... H04L 67/02 709/225 |
| 2014/0297863 | A1* | 10/2014 | Zhu ......................... H04L 47/70 709/225 |
| 2014/0315579 | A1* | 10/2014 | Liu .......................... H04L 67/18 455/456.2 |

FOREIGN PATENT DOCUMENTS

| CN | 102984115 A | 3/2013 |
| CN | 104104654 A | 10/2014 |
| CN | 104468487 A | 3/2015 |
| CN | 104683296 A | 6/2015 |
| CN | 105050081 A | 11/2015 |
| WO | 2013147810 A1 | 10/2013 |

OTHER PUBLICATIONS

The State Intellectual Property Office of the People's Republic of China (SIPO) Office Action 1 for 201510512991.6 dated Nov. 21, 2016 7 Pages.

* cited by examiner

METHOD FOR CONNECTING NETWORK ACCESS DEVICE TO WIRELESS NETWORK ACCESS POINT, NETWORK ACCESS DEVICE, AND APPLICATION SERVER

RELATED APPLICATION

This application is a continuation application of PCT Patent Application No. PCT/CN2016/083974, filed on May 30, 2016, which claims priority to Chinese Patent Application No. 201510512991.6, filed with the Chinese Patent Office on Aug. 19, 2015 and entitled "METHOD, APPARATUS, AND SYSTEM FOR CONNECTING NETWORK ACCESS DEVICE TO WIRELESS NETWORK ACCESS POINT", the entire contents of both of which are incorporated herein by reference.

FIELD OF THE TECHNOLOGY

The present disclosure relates to the field of network communications, and in particular, to a method for connecting a network access device to a wireless network access point, a network access device, an application server, and a non-volatile computer readable storage medium.

BACKGROUND OF THE DISCLOSURE

With the development of network technologies, networks already become a part of people's life, and bring great convenience to people's life. To satisfy network requirements of people, many places provide wireless network (for example, WiFi) access points for users to connect to, and further to access the Internet.

A user runs an application program after connecting to a WiFi access point by using a network access device, sends a network access request to the WiFi access point by using the application program, and adds a token parameter to the request. The WiFi access point may send a request to an application server, and adds the token parameter in the request. The application server checks the token parameter, obtains an authentication result, and synchronously returns the authentication result to the WiFi access point. The WiFi access point determines whether to allow the application program to pass according to the authentication result. Although the identity of the application program accessing a terminal is verified by using the token parameter, there is a security risk in a transmission process of the token parameter, and it is not secure enough.

SUMMARY

The present disclosure provides: a method for connecting a network access device to a wireless network access point, a network access device, an application server, and a non-volatile computer readable storage medium.

A method for connecting a network access device to a wireless network access point includes: initiating, by a network access device, an access request to a wireless network access point, wherein when detecting that the network access device is not authenticated, the wireless network access point redirects the access request to an authentication portal, the access request carrying an authentication server address; obtaining authentication authorization of a user on the authentication portal; obtaining, by an application client on the network access device, an authentication parameter after obtaining the authentication authorization; encrypting the authentication parameter by using a wireless access key; initiating, according to the authentication server address, an authentication request carrying the encrypted authentication parameter to an authentication server, wherein the authentication server obtains an encrypted signature from an application server that decrypts and validates the authentication parameter by using the wireless access key, and generates a login address; receiving, by the application client on the network access device, the login address and the encrypted signature from the authentication server; accessing the login address on the authentication server, wherein the authentication server returns a pass-through result; and connecting, by the network access device, to the wireless network access point to access the Internet according to the pass-through result.

A method for connecting a network access device to a wireless network access point includes: receiving, by an application server, an authentication request from an authentication server, wherein the authentication request carries an authentication parameter encrypted by an application client on a network device using a wireless access key, and is sent to the authentication server when the network access device is not authenticated; decrypting, by the application server, the authentication request by using the wireless access key, to obtain the authentication parameter; verifying the authentication parameter to obtain an authentication result; after determining that the authentication result is successful, generating an encrypted signature by using the wireless access key; and returning the authentication parameter, the authentication result, and the encrypted signature to the authentication server, wherein the authentication server generates a login address, and sends the encrypted signature and the login address to the application client on the network access device; and the application client on the network access device decrypts the encrypted signature, accesses the login address, and connects, according to a pass-through result after accessing the login address, to a wireless network access point to access the Internet.

A system for connecting a network access device to a wireless network access point includes: a network access device, a wireless network access point, an authentication server, and an application server; the wireless network access point being configured to: when detecting that a network access device initiating an access request is not authenticated, redirect the access request to an authentication portal, the access request carrying an authentication server address; the network access device being configured to: obtain an authentication parameter after obtaining authentication authorization of a user on the authentication portal and by using the application client, encrypt the authentication parameter by using a wireless access key, and initiate, according to the authentication server address, an authentication request carrying the encrypted authentication parameter to an authentication server; the authentication server being configured to send the authentication request carrying the encrypted authentication parameter to the application server; the application server being configured to: decrypt the authentication request after receiving the authentication request and by using the wireless access key, to obtain the authentication parameter, authenticate the authentication parameter to obtain an authentication result, generate an encrypted signature by using the wireless access key, and return the authentication parameter, the authentication result, and the encrypted signature to the authentication server; the authentication server being further configured to: receive the authentication parameter, the authentication result, and the encrypted signature, generate a user authentication result determining address, and return the user authentication result determining address and the encrypted signature to the application client on the network access device; and the network access device being further configured to: decrypt the encrypted signature after receiving the encrypted signature and the user authentication result address and by using the application client, verify the decrypted signature, access the user authentication result address after the verification succeeds, receive a pass-through result that is returned by the authentication server according to access of the user authentication result address, and connect, according to the pass-through result, to a wireless network access point to access the Internet.

A network access device includes a memory and a processor, the memory storing a computer readable instruction to be executed by the processor, wherein the processor is configured for: initiating an access request to a wireless network access point, wherein when detecting that the network access device is not authenticated, the wireless network access point redirects the access request to an authentication portal, the access request carrying an authentication server address; obtaining, by an application client on the network access device, authentication authorization of a user on the authentication portal; obtaining an authentication parameter after obtaining the authentication authorization; encrypting the authentication parameter by using a wireless access key; initiating, to an authentication server according to an authentication server address, an authentication request carrying the encrypted authentication parameter, wherein the authentication server obtains an encrypted signature from an application server that decrypts and validates the authentication parameter by using the wireless access key, and generates a login address; receiving the encrypted signature and a login address from the authentication server; decrypting the encrypted signature by using the wireless access key to obtain a decrypted signature for verification; accessing the login address after the verification succeeds, wherein the authentication server returns a pass-through result; and connecting, according to the pass-through result, to the wireless network access point to access the Internet.

An application server includes a memory and a processor, the memory storing a computer readable instruction to be executed by the processor, wherein the processor is configured for: receiving an authentication request from an authentication server, wherein the authentication request carries an authentication parameter encrypted by an application client on a network device using a wireless access key, and is sent to the authentication server when the network access device is not authenticated; decrypting the authentication request by using the wireless access key, to obtain the authentication parameter; verifying the authentication parameter to obtain an authentication result; after determining that the authentication result is successful, generating an encrypted signature by using the wireless access key; and returning the authentication parameter, the authentication result, and the encrypted signature to the authentication server, wherein the authentication server generates a login address, and sends the encrypted signature and the login address to the application client on the network access device; and the application client on the network access device decrypts the encrypted signature, accesses the login address, and connects, according to a pass-through result after accessing the login address, a wireless network access point to access the Internet.

One or more non-volatile computer readable storage media including a computer executable instruction is provided, when the computer executable instruction is executed by one or more processors, the one or more processors being enabled to perform: obtaining an authentication parameter after a wireless network access point detects that the network access device is not authenticated; encrypting the authentication parameter by using a wireless access key; initiating, to an authentication server according to an authentication server address in an access request that is redirected when the network access device is not authenticated, an authentication request carrying the authentication parameter that is encrypted by using the wireless access key; receiving an encrypted signature and a user authentication result address that are returned by the authentication server; decrypting the encrypted signature; verifying the decrypted signature, and accessing the user authentication result address after the verification succeeds; and receiving a pass-through result that is returned by the authentication server according to access of the user authentication result address, and connecting, according to the pass-through result, to the wireless network access point to access the Internet; the encrypted signature being generated by using the wireless access key and after an application server decrypts the authentication request carrying the encrypted authentication parameter to obtain the authentication parameter; and the user authentication result address being generated after the authentication server receives the authentication parameter, an authentication result, and the encrypted signature that are sent by the application server.

Details about one or more embodiments of the present invention are described in the following accompanying drawings and descriptions. Other features, objectives, and advantages of the present disclosure become obvious according to this specification, the accompanying drawings, and claims.

BRIEF DESCRIPTION OF THE DRAWINGS

To describe the technical solutions in the embodiments of the present invention or the prior art more clearly, the accompanying drawings required for describing the embodiments or the prior art are briefly described. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make objectives, technical solutions, and advantages of the present disclosure clearer and more comprehensible, the present disclosure is further described in detail below with reference to the accompanying drawings and embodiments. It should be understood that specific embodiments described herein are merely used to explain the present disclosure but are not intended to limit the present disclosure.

Figure 1:
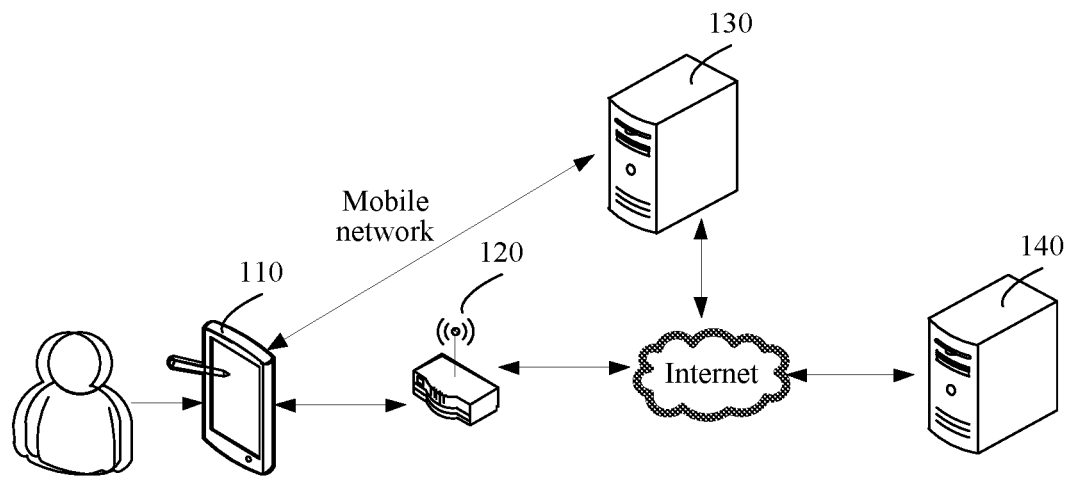
FIG. 1 is a schematic diagram of an application environment of a method for connecting a network access device to a wireless network access point according to an embodiment.

FIG. 1 is a schematic diagram of an application environment of a method for connecting a network access device to a wireless network access point according to an embodiment. As shown in FIG. 1, the application environment includes: a network access device 110, a wireless network access point 120, an authentication server 130, and an application server 140.

An application client is installed on the network access device 110. A user accesses the application server 140 through the Internet after connecting the application client of the network access device 110 to the wireless network access point 120. The application client may be an instant messaging client, a payment client, an email client, and the like. Further, besides decrypting authentication parameter and sending encrypted signature, the application server may be a server providing services corresponding to the application client, such as instant messaging services, electronic payment services, email services, and the like. When the application client is installed on the network access device 110, the application client may obtain the wireless access key remotely from the application server or locally from the installation package.

The network access device 110 initiates an access request to any website when connecting to the wireless network access point 120. The wireless network access point 120 detects whether the network access device 110 is authenticated. If the network access device 110 is not authenticated, the access request is redirected to a WiFi portal (authentication portal). The authentication portal is displayed on the network access device 110. The network access device 110 calls the application client after obtaining authorization authentication of a user on the authentication portal. The application client encrypts an authentication parameter by using a wireless access key, and initiates an authentication request carrying the encrypted authentication parameter to the authentication server 130. The WiFi portal is a place provided for a WiFi service, and is a login portal that is pushed when the user accesses WiFi. The WiFi portal may be provided/configured by a third-party merchant, such as a restaurant, a hotel, etc.

The wireless network access point 120 may be a wireless AP (an access Point, a wireless access node, a session point, or an access bridge), a wireless router, or a wireless controller (also called a wireless access point controller, or AC). The wireless AP may be a pure wireless network access point, or may be a device such as a wireless router. The wireless controller is a network device, is configured to control wireless APs together, is a core of a wireless network, and is responsible for managing all wireless APs in the wireless network. The management on the APs includes: delivery of a configuration, changes of a configuration parameter, intelligent management on a radio frequency, and control of access security.

The authentication server 130 sends the authentication request carrying the encrypted authentication parameter to the application server 140 in a Hyper Text Transfer Protocol over Secure Socket Layer (HTTPS) manner. The HTTPS is an HTTP channel aiming at security. The authentication server 130 may be a server providing a network access service in a shopping market, a specified location, or the like.

The application server 140 decrypts the authentication request after receiving the authentication request to obtain the authentication parameter, checks legitimacy of the authentication request, authenticates the authentication parameter obtained after decryption, where the authentication parameter includes hardware parameter information and a user identifier, authenticates the authentication parameter to obtain an authentication result, generates an encrypted signature by using the wireless access key, and returns the authentication parameter, the authentication result, and the encrypted signature to the authentication server 130.

The authentication server 130 records the authentication parameter, and synchronously returns a user authentication result address and the encrypted signature to the network access device 110 according to the authentication result. The authentication server 130 may be a server of the authentication portal. The authentication server 130 may further determine legitimacy of the wireless network access point 120 according to the authenticated hardware information, and record the authentication parameter for query of an organization such as a network supervision organization.

The application client on the network access device 110 decrypts the encrypted signature after receiving the encrypted signature, verifies the signature, determines that the returned signature is legal if the verification succeeds, accesses the user authentication result address, receives a pass-through result that is returned by the authentication server 120 according to access of the user authentication result address, and connects, according to the pass-through result, to the wireless network access point 120 to access the Internet.

Figure 2:
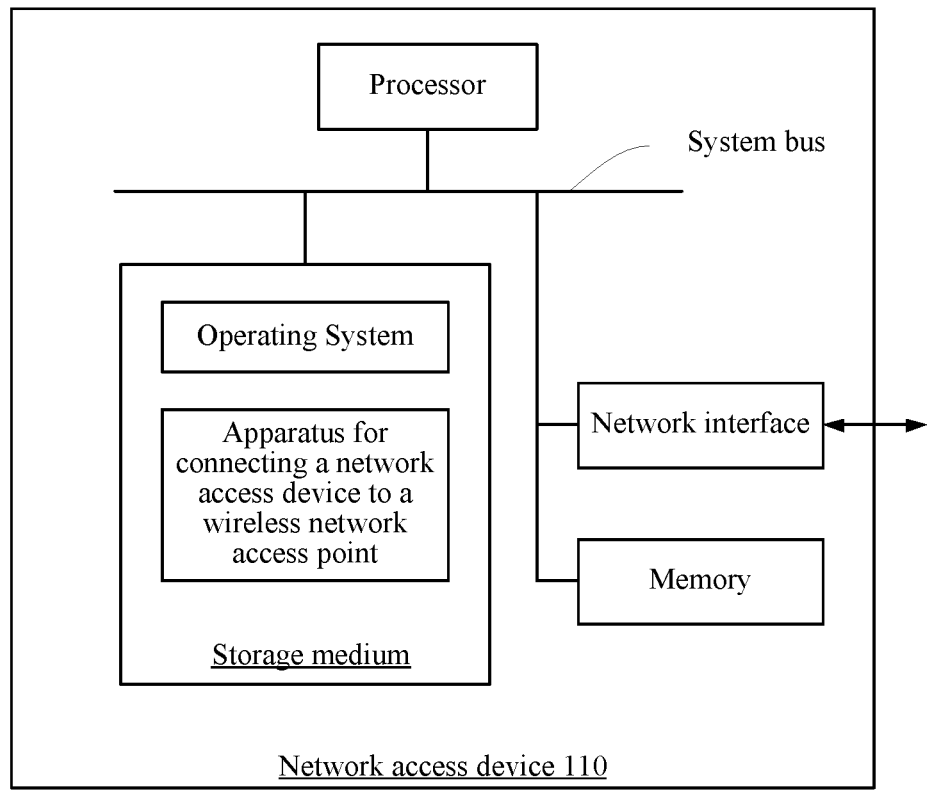
FIG. 2 is a schematic diagram of an internal structure of a network access device according to an embodiment.

FIG. 2 is a schematic diagram of an internal structure of a network access device according to an embodiment. As shown in FIG. 2, the network access device 110 includes: a processor, a storage medium, a memory, and a network interface that are connected by using a system bus. The storage medium in the network access device 110 stores an operating system, and further includes an apparatus for connecting a network access device to a wireless network access point. The apparatus for connecting a network access device to a wireless network access point is configured to implement a method for connecting a network access device to a wireless network access point. The processor is configured to provide a computation capability and a control capability to support operation of the entire network access device. The memory in the network access device 110 provides an environment for operation of the apparatus for connecting a network access device to a wireless network access point in the storage medium. The network interface is configured to perform network communication with a wireless network access point 120, an authentication server 130, and an application server 140, for example, send an authentication request to the authentication server 130, receive an authentication result, a pass-through result, a pass-through time, and the like that are returned by the authentication server 130. The network access device 110 may be a smartphone, a notebook computer, a tablet computer, a personal digital assistant, or the like. A person skilled in the art may understand that the structure shown in FIG. 2 is merely a block diagram of a part of structure related to this application solution, and does not constitute any limitation to a terminal to which this application solution is applied. A specific terminal may include more or less components than that are shown in the figure or a combination of some components, or have a different component arrangement.

Figure 3:
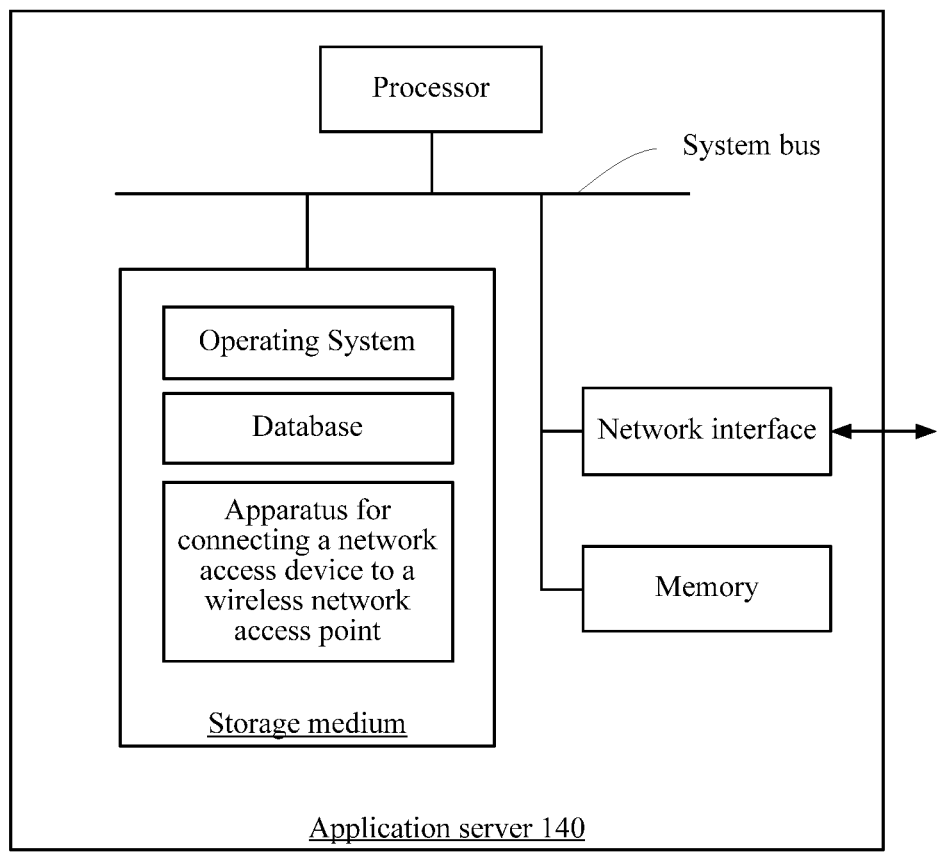
FIG. 3 is a schematic diagram of an internal structure of an application server according to an embodiment.

FIG. 3 is a schematic diagram of an internal structure of an application server according to an embodiment. As shown in FIG. 3, the application server 140 includes a processor, a storage medium, a memory, and a network interface that are connected by using a system bus. The storage medium in the application server 140 stores an operating system, a database, and an apparatus for connecting a network access device to a wireless network access point. The database stores an authentication parameter and a wireless access key. The apparatus for connecting a network access device to a wireless network access point is configured to implement a method for connecting a network access device to a wireless network access point applicable to the application server 140. The processor in the application server 140 is configured to provide a computation capability and a control capability, to support operation of the entire the application server. The memory in the application server provides an environment for operation of the apparatus for connecting a network access device to a wireless network access point in the storage medium. The network interface in the application server 140 is configured to connect to and communicate with an authentication server 130 and a network access device 110 that are on the outside by using a network, for example, receive an authentication request that is transmitted by the authentication server 130 and that is sent by the network access device 110, and return an authentication result, the authentication parameter, and an encrypted signature to the authentication server 130. The application server may be implemented by using an independent server or a server cluster formed by multiple servers. A person skilled in the art may understand that the structure shown in FIG. 3 is merely a block diagram of a part of structure related to this application solution, and does not constitute any limitation to a server to which this application solution is applied. A specific server may include more or less components than that are shown in the figure or a combination of some components, or have a different component arrangement.

In addition, the authentication server 130 may include a processor, a storage medium, a memory, and a network interface that are connected by using a system bus.

Figure 4:
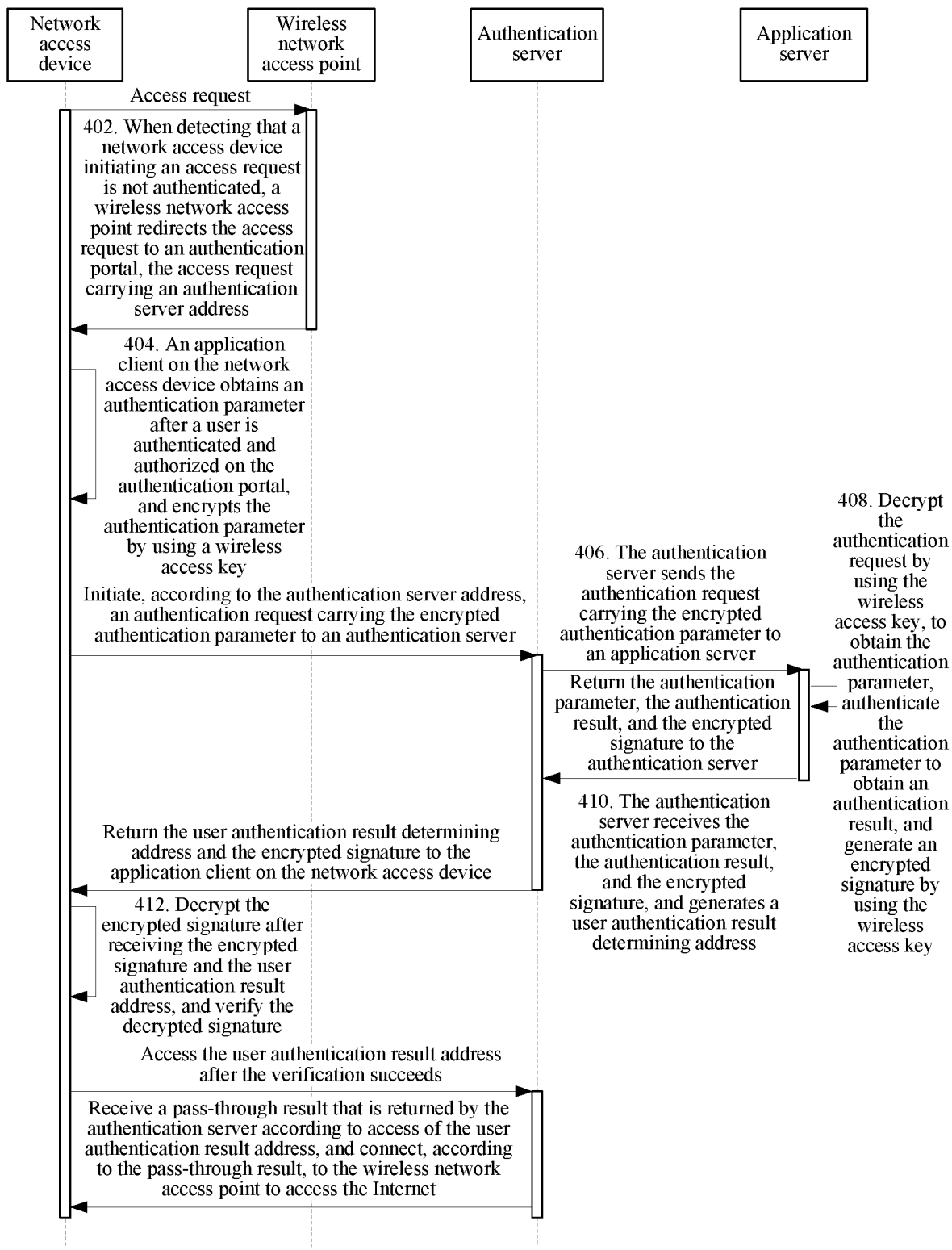
FIG. 4 is a flowchart of a method for connecting a network access device to a wireless network access point according to an embodiment.

FIG. 4 is a flowchart of a method for connecting a network access device to a wireless network access point according to an embodiment. As shown in FIG. 4, a method for connecting a network access device to a wireless network access point runs in the application environment of FIG. 1, and includes the following blocks.

Block 402: When detecting that a network access device initiating an access request is not authenticated, a wireless network access point redirects the access request to an authentication portal, the access request carrying an authentication server address. In other words, the network access device initiates an access request to a wireless network access point. Further, if not authenticated, the network access device is redirected by the wireless network access point to an authentication portal.

Specifically, the network access device accesses any website after connecting to the wireless network access point. The wireless network access point detects whether the network access device is authenticated. If the network access device is authenticated, the network access device may access the website. If the network access device is not authenticated, the wireless network access point redirects the access request to the authentication portal, the access request carrying the authentication server address.

A table is maintained in the wireless network access point, and the table includes information such as a Media Access Control (MAC) address of the authenticated network access device and a remaining pass-through time mapped by the MAC address. The wireless network access point first queries from the table when there is a network access device connecting to the wireless network access point (for example, a WiFi hotspot). If the MAC address of the network access device is in the table, and the pass-through time (e.g., permitted time duration) does not expire, it is considered that the network access device is authenticated, and the network access device is directly allowed to pass to access the network. Otherwise, it is considered that the network access device is not authenticated. The pass-through time refers to a time that the network access device is allowed to access the Internet by connecting to the wireless network access point.

The redirection of the access request is that a portal may be redirected to by means of HTTP 302, where a hardware parameter and the authentication server address are added to a link of the portal so as to be obtained by an application client. The hardware parameter information includes an equipment identifier of the network access device and an equipment identifier of the wireless network access point. The equipment identifier may be a MAC address, an identification number for representing uniqueness of a device, or the like.

Block 404: An application client on a network access device obtains an authentication parameter after obtaining authentication authorization of a user on the authentication portal, encrypts the authentication parameter by using a wireless access key, and initiates, according to the authentication server address, an authentication request carrying the encrypted authentication parameter to an authentication server. Further, the authentication server may communicate with an application server corresponding to the application client, obtain an encrypted signature from the application server that decrypts and validates the authentication parameter, and generate a login address.

Figure 5:
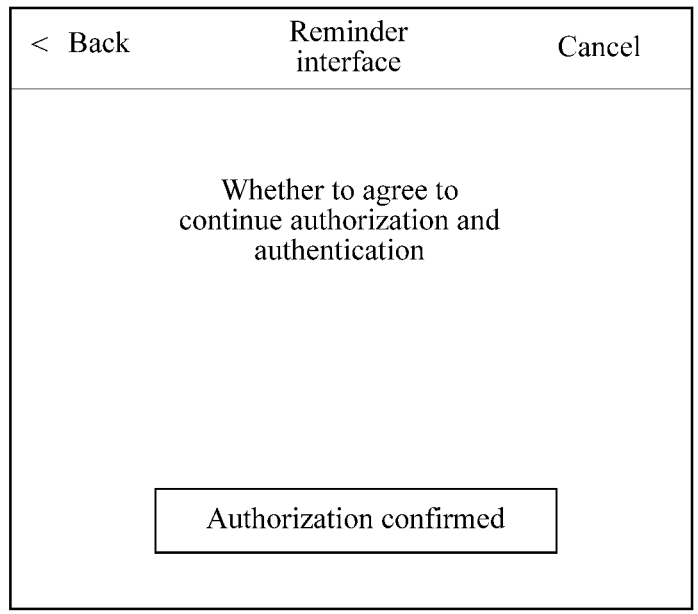
FIG. 5 is a schematic diagram of an interface for determining authorization on an authentication portal according to an embodiment.

Specifically, the authentication portal is switched to after the access request is redirected to the authentication portal. A reminder interface is displayed on the authentication portal for a user to agree authentication authorization, or an interface of whether to agree to continue authorization authentication is switched to in a process in which the authentication portal directly automatically calls an application program. As shown in FIG. 5, the authentication portal is switched to. A reminder interface is displayed on the authentication portal. The reminder interface displays whether to agree continue authorization authentication, and provides an authorization determining control and an authorization cancellation control. In some embodiments, the reminder interface only requires a single user action (e.g., one-click, one-touch) to agree to the authorization authentication, without inputting any password or requiring other additional user actions.

The authentication parameter may include hardware parameter information and a user identifier. The hardware parameter information includes an equipment identifier of the network access device and an equipment identifier of the wireless network access point. The user identifier is a feature value used to uniquely identify a user identity of an application program, and may be an instant messaging account, an email account, and the like, but is not limited thereto. In some embodiments, the wireless access key on the network access device is maintained by the application client in accordance with the application server.

Block 406: The authentication server sends the authentication request carrying the encrypted authentication parameter to an application server.

Specifically, the authentication server sends the encrypted authentication parameter to the application server after receiving the encrypted authentication parameter.

The authentication server is configured to send the authentication request carrying the encrypted authentication parameter to the application server.

Specifically, the authentication server sends, in an HTTPS manner, the authentication request carrying the encrypted authentication parameter to the application server. Information transmitted by means of HTTPS is secure, and is not easy to maliciously intercept or give away.

Block 408: The application server decrypts the authentication request after receiving the authentication request and by using the wireless access key, to obtain the authentication parameter, authenticates the authentication parameter to obtain an authentication result, generates an encrypted signature by using the wireless access key, and returns the authentication parameter, the authentication result, and the encrypted signature to the authentication server.

Specifically, the wireless access key refers to a key generated on which the application server and the application client agree, or a key generated by the application server, and is sent to the application client.

The authentication request is decrypted to obtain the authentication parameter, representing that the authentication request is from a legal application client. The authentication parameter may include hardware parameter information and a user identifier. The user identifier is authenticated, that is, the user identifier is compared with a user identifier stored on the application server. If the two user identifiers are the same, the authentication succeeds. If the two user identifiers are different, the authentication fails. The hardware parameter information is authenticated, that is, the hardware parameter information is compared with hardware parameter information stored on the application server. If the two pieces of hardware parameter information are the same, the authentication succeeds. If the two pieces of hardware parameter information are different, the authentication fails. Alternatively, the user identifier may be only authenticated.

In this embodiment, the encrypted signature is generated by using the wireless access key and the user identifier, or the encrypted signature is generated by using the wireless access key, the user identifier, and a time stamp.

Specifically, the encrypted signature generated by using the wireless access key may be generated by a signature algorithm on which the application server and the application client agree. For example, the application server calculates an md5 value (that is, an encrypted signature) by using a WiFi key (a wireless access key) and a user identifier, and returns the md5 value to the application client on the network access device. The application client also calculates an md5 value (that is, an encrypted signature) by using a WiFi key and a user identifier of the application client. If the md5 value generated by the application server is consistent with the md5 value generated by the application client, the signature is legal, and it indicates that the application server is authenticated. Alternatively, the application server calculates a signature by using a time stamp, a user identifier, and a WiFi key and by using a sha1 algorithm, and simultaneously returns the time stamp and the signature to the application client on the network access device. The application client calculates a signature by using the WiFi key and the user identifier of the application client and the returned time stamp and by using the sha1 algorithm. The signature calculated by the application client is compared with the returned signature. If the signatures are consistent, the signature is legal, and it indicates that the application server is authenticated.

The application server sends the authentication parameter, the authentication result, and the encrypted signature to the authentication server in an HTTPS manner.

In addition, the application server queries detailed information about a user identity according to the user identifier, and returns the detailed information about the user identity to the authentication server.

Block 410: The authentication server receives the authentication parameter, the authentication result, and the encrypted signature, generates a login address, and returns the user authentication result determining address and the encrypted signature to the application client on the network access device. The login address, as used herein, may also be referred as user authentication result determining address or user authentication result determining address.

Specifically, after receiving the authentication parameter, the authentication server may authenticate the hardware parameter information in the authentication parameter, and compares the equipment identifier of the wireless network access point with the equipment identifier of the wireless network access point that is stored on the authentication server. If the two equipment identifiers are the same, authentication on the wireless network access point succeeds. If the two equipment identifiers are different, authentication on the wireless network access point fails.

After receiving the authentication result, the authentication server synchronously generates a user authentication result determining address (a login address). It is determined, by using the user authentication result determining address, that the authentication request received by the authentication server is from a legal application client. Moreover, the user authentication result address is one-time effective, and cannot be maliciously intercepted for use.

Block 412: The application client on the network access device decrypts the encrypted signature after receiving the encrypted signature and the user authentication result address, verifies the decrypted signature, accesses the user authentication result address after the verification succeeds, receives a pass-through result that is returned by the authentication server according to access of the user authentication result address, and connects, according to the pass-through result, to the wireless network access point to access the Internet.

Specifically, after receiving the encrypted signature, the application client decrypts the encrypted signature to obtain the signature. The encrypted signature may be generated by using the wireless access key and the user identifier, or the encrypted signature may be generated by using the wireless access key, the user identifier, and the time stamp. The foregoing manner may be used. For example, the application client generates an md5 value by using the wireless access key and the user identifier, and compares the md5 value with an md5 value that is returned by the application server and that is generated according to the wireless access key and the user identifier. If the two md5 values are the same, verification on the signature succeeds.

The authentication server may further return the pass-through result to the wireless network access point. The pass-through result is whether passing through succeeds. If the passing through succeeds, the network access device is allowed to connect to the wireless network access point to normally access the Internet. In other words, the pass-through result indicates that the network access device is authenticated and can access the Internet through the wireless network access point. Based on the pass-through result, the wireless network access point can update the table to include information of the network access device and/or the pass-through time of the network access device.

In addition, the authentication server returns a pass-through time to the wireless network access device or the wireless network access point after learning that the network access device accesses the user authentication result address. The pass-through time refers to a time that the network access device is allowed to access the Internet by connecting to the wireless network access point. In this way, the quantity of people surfing the Internet at the same time may be limited, and the Internet traffic is properly distributed.

According to the foregoing method for connecting a network access device to a wireless network access point, when a network access device is not authenticated, the network access device initiates an authentication request to an authentication server after encrypting an authentication parameter by using a wireless access key. Then the authentication server sends the authentication request carrying the encrypted authentication parameter to an application server. The application server performs decryption to obtain the authentication parameter. The authentication parameter is transmitted in a ciphertext manner in a transmission process, thereby improving security of data transmission. The application server generates an encrypted signature by using the wireless access key, and returns the encrypted signature and an authentication result on the authentication parameter to the authentication server. The authentication server sends the encrypted signature, the authentication result, and the generated user authentication result determining address to the network access device. The network access device verifies the encrypted signature. If the verification succeeds, it indicates that authentication on the application server succeeds. Then the user authentication result determining address is accessed. An application client and the application server are separately verified, thereby improving security. The application client accesses the user authentication result determining address. The authentication server further authenticates the application client. In this way, triple verifications are used, thereby ensuring security.

In an embodiment, the foregoing method for connecting a network access device to a wireless network access point further includes: periodically updating, by an application server, a wireless access key, and sending the updated wireless access key to an application client on a network access device to update the wireless access key on the application client on the network access device.

Figure 6:
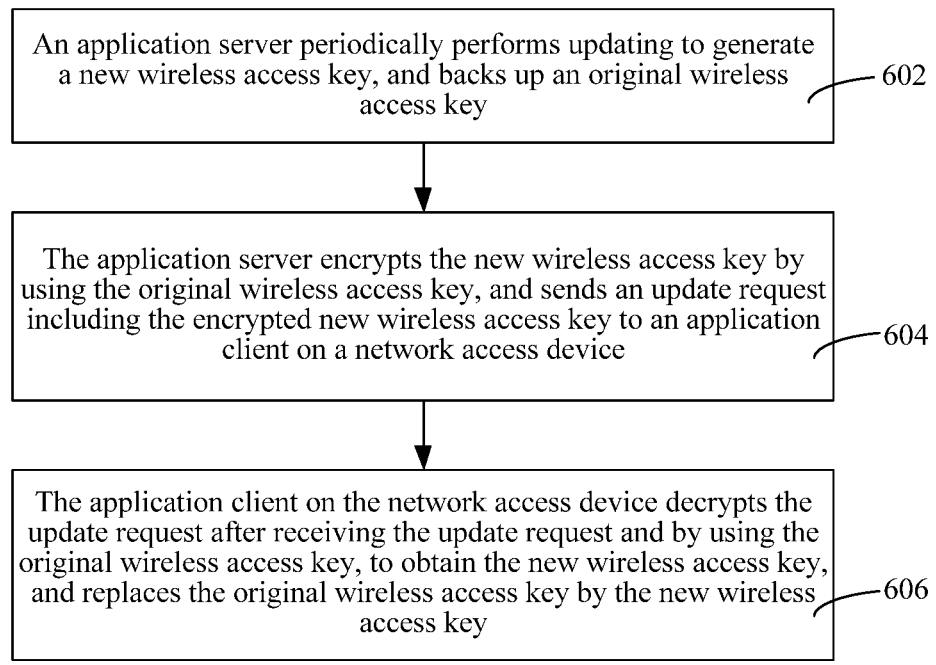
FIG. 6 is a specific flowchart showing that an application server periodically updates a wireless access key, and sends the updated wireless access key to an application client on a network access device to update the wireless access key on the application client on the network access device according to an embodiment.

FIG. 6 is a specific flowchart showing that an application server periodically updates a wireless access key, and sends the updated wireless access key to an application client on a network access device to update the wireless access key on the application client on the network access device according to an embodiment. As shown in FIG. 6, that an application server periodically updates a wireless access key, and sends the updated wireless access key to an application client on a network access device to update the wireless access key on the application client on the network access device includes the following blocks:

Block 602: The application server periodically performs updating to generate a new wireless access key, and backs up an original wireless access key.

Block 604: The application server encrypts the new wireless access key by using the original wireless access key, and sends an update request including the encrypted new wireless access key to the application client on the network access device.

Block 606: The application client on the network access device decrypts the update request after receiving the update request and by using the original wireless access key, to obtain the new wireless access key, and replaces the original wireless access key by the new wireless access key.

In addition, when the application server does not completely finish updating, it is ensured that the new wireless access key and the original wireless access key may be compatibly used, thereby ensuring a normal service.

In some embodiments, multiple network access devices may use the same wireless access key to encrypt/decrypt information, and periodically obtain updated wireless access key from the application server. In other embodiments, the wireless access key may be associated with a user account for logging in the application client. That is, the authentication request may include the encrypted authentication parameter and the account number. The application server may determine a wireless access key corresponding to the account number, and decrypt the authentication parameter with the corresponding wireless access key.

Security may be improved by periodically updating the wireless access key and preventing the wireless access key from being given away.

Figure 7:
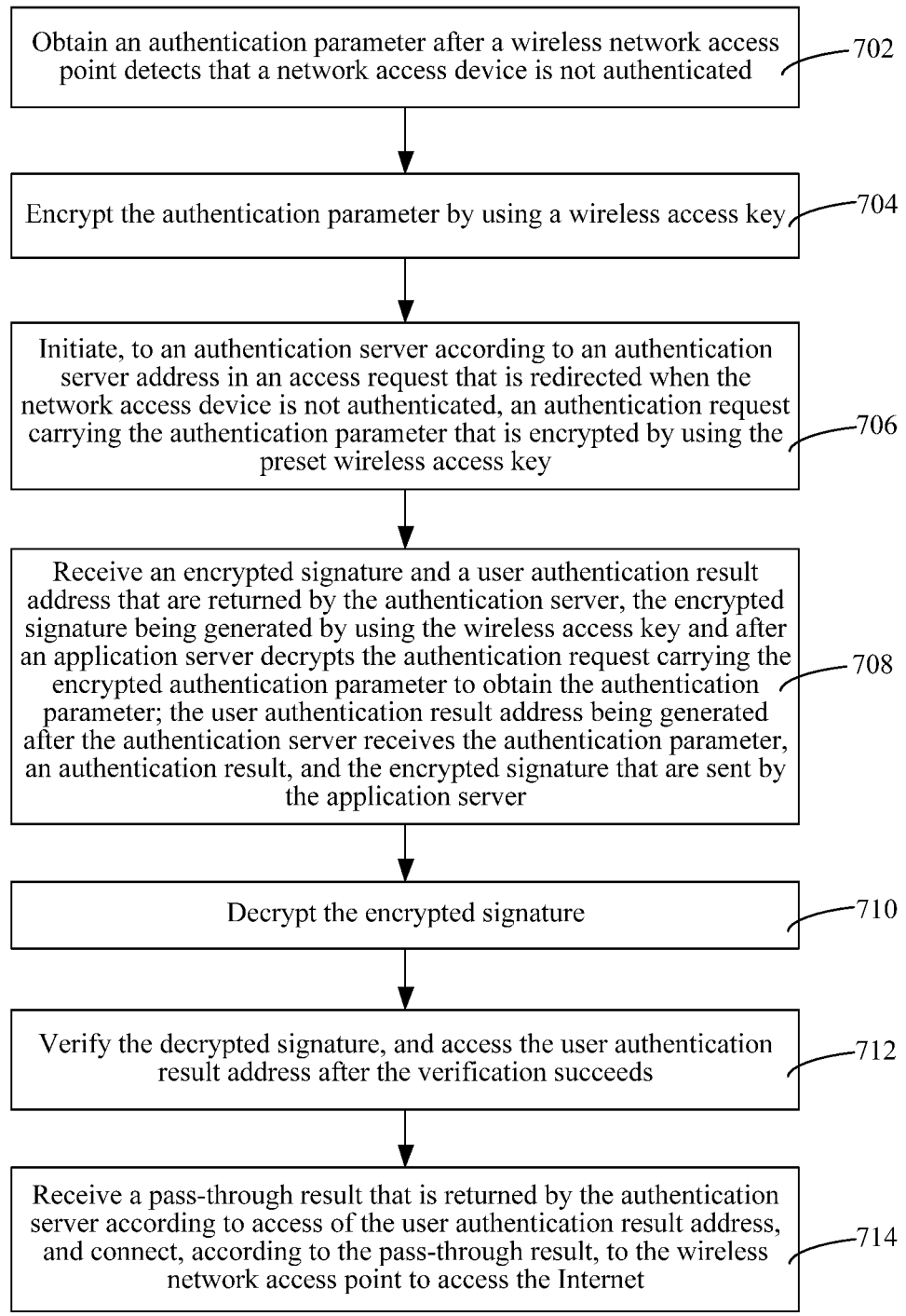
FIG. 7 is a flowchart of a method for connecting a network access device to a wireless network access point according to another embodiment.

FIG. 7 is a flowchart of a method for connecting a network access device to a wireless network access point according to another embodiment. The method for connecting a network access device to a wireless network access point in FIG. 7 is described from the perspective of a network access device. For details that are not described, refer to the description of the method for connecting a network access device to a wireless network access point in FIG. 4. As shown in FIG. 7, a method for connecting a network access device to a wireless network access point includes the following blocks:

Block 702: Obtain an authentication parameter after a wireless network access point detects that a network access device is not authenticated.

Specifically, the network access device accesses any website after connecting to the wireless network access point. The wireless network access point detects whether the network access device is authenticated. If yes, the network access device may access the website. If the network access device is not authenticated, the wireless network access point redirects an access request to an authentication portal, the access request carrying an authentication server address.

A table is maintained in the wireless network access point, and the table includes information such as a MAC address of the authenticated network access device and a remaining pass-through time mapped by the MAC address. The wireless network access point first queries from the table when there is a network access device connecting to the wireless network access point (for example, a WiFi hotspot). If the MAC address of the network access device is in the table, and the pass-through time does not expire, it is considered that the network access device is authenticated, and the network access device is directly allowed to pass to access the network. Otherwise, it is considered that the network access device is not authenticated. The pass-through time refers to a time that the network access device is allowed to access the Internet by connecting to the wireless network access point.

After the wireless network access point detects that the network access device is not authenticated, the access request of the network access device is redirected to the authentication portal to switch to the authentication portal. A reminder interface is displayed on the authentication portal for a user to agree authentication authorization, or an interface of whether to agree to continue authorization authentication is switched to in a process in which the authentication portal directly automatically calls an application program. The authentication parameter is obtained after authentication authorization of the user on the authentication portal is obtained.

The authentication parameter may include hardware parameter information and a user identifier. The hardware parameter information may include an equipment identifier of the network access device and an equipment identifier of the wireless network access point, etc. The user identifier is a feature value used to uniquely identify a user identity of an application program, and may be an instant messaging account, an email account, and the like, but is not limited thereto.

Block 704: Encrypt the authentication parameter by using a wireless access key.

Block 706: Initiate, to an authentication server according to an authentication server address in an access request that is redirected when the network access device is not authenticated, an authentication request carrying the authentication parameter that is encrypted by using the wireless access key.

Block 708: Receive an encrypted signature and a user authentication result address that are returned by the authentication server, the encrypted signature being generated by using the wireless access key and after an application server decrypts the authentication request carrying the encrypted authentication parameter to obtain the authentication parameter; and the user authentication result address being generated after the authentication server receives the authentication parameter, an authentication result, and the encrypted signature that are sent by the application server.

The encrypted signature is generated by using the wireless access key and the user identifier, or is generated by using the wireless access key, the user identifier, and a time stamp.

Block 710: Decrypt the encrypted signature.

Specifically, the network access device decrypts the encrypted signature to obtain the signature.

Block 712: Verify the decrypted signature, and access the user authentication result address after the verification succeeds.

In this embodiment, the encrypted signature is generated by using the wireless access key and the user identifier, or the encrypted signature is generated by using the wireless access key, the user identifier, and a time stamp.

Specifically, the encrypted signature generated by using the wireless access key may be generated by a signature algorithm on which the application server and the application client agree. For example, the application server calculates an md5 value (that is, an encrypted signature) by using a WiFi key (a wireless access key) and a user identifier, and returns the md5 value to the application client on the network access device. The application client also calculates an md5 value (that is, an encrypted signature) by using a WiFi key and a user identifier of the application client. If the md5 value generated by the application server is consistent with the md5 value generated by the application client, the signature is legal, and it indicates that the application server is authenticated. Alternatively, the application server calculates a signature by using a time stamp, a user identifier, and a WiFi key and by using a sha1 algorithm, and simultaneously returns the time stamp and the signature to the application client on the network access device. The application client calculates a signature by using the WiFi key and the user identifier of the application client and the returned time stamp and by using the sha1 algorithm. The signature calculated by the application client is compared with the returned signature. If the signatures are consistent, the signature is legal, and it indicates that the application server is authenticated.

Block 714: Receive a pass-through result that is returned by the authentication server according to access of the user authentication result address, and connect, according to the pass-through result, to the wireless network access point to access the Internet.

The pass-through result is whether passing through succeeds. If the passing through succeeds, the network access device is allowed to connect to the wireless network access point to normally access the Internet.

In addition, a pass-through time that is returned by the authentication server after the authentication server learns that the user authentication result address is accessed is received. The pass-through time refers to a time that the network access device is allowed to access the Internet by connecting to the wireless network access point. In this way, the quantity of people surfing the Internet at the same time may be limited, and the Internet traffic is properly distributed.

According to the foregoing method for connecting a network access device to a wireless network access point, when a network access device is not authenticated, the network access device initiates an authentication request to an authentication server after encrypting an authentication parameter by using a wireless access key. Then the authentication server sends the authentication request carrying the encrypted authentication parameter to an application server. The application server performs decryption to obtain the authentication parameter. The authentication parameter is transmitted in a ciphertext manner in a transmission process, thereby improving security of data transmission. The application server generates an encrypted signature by using the wireless access key, and returns the encrypted signature and an authentication result on the authentication parameter to the authentication server. The authentication server sends the encrypted signature, the authentication result, and the generated user authentication result determining address to the network access device. The network access device verifies the encrypted signature. If the verification succeeds, it indicates that authentication on the application server succeeds. Then the user authentication result determining address is accessed. An application client and the application server are separately verified, thereby improving security. The application client accesses the user authentication result determining address. The authentication server further authenticates the application client. In this way, triple verifications are used, thereby ensuring security.

In an embodiment, the foregoing method for connecting a network access device to a wireless network access point further includes: receiving a wireless access key updated by the application server.

Further, the block of receiving a wireless access key updated by the application server includes: receiving an update request that is sent by the application server and that includes the encrypted new wireless access key, where the new wireless access key performs encryption by using the original wireless access key; and decrypting the update request by using the original wireless access key according to the update request, to obtain the new wireless access key, and replacing the original wireless access key by the new wireless access key.

In addition, when the application server does not completely finish updating, it is ensured that the new wireless access key and the original wireless access key may be compatibly used, thereby ensuring a normal service.

Security may be improved by periodically updating the wireless access key and preventing the wireless access key from being given away.

Figure 8:
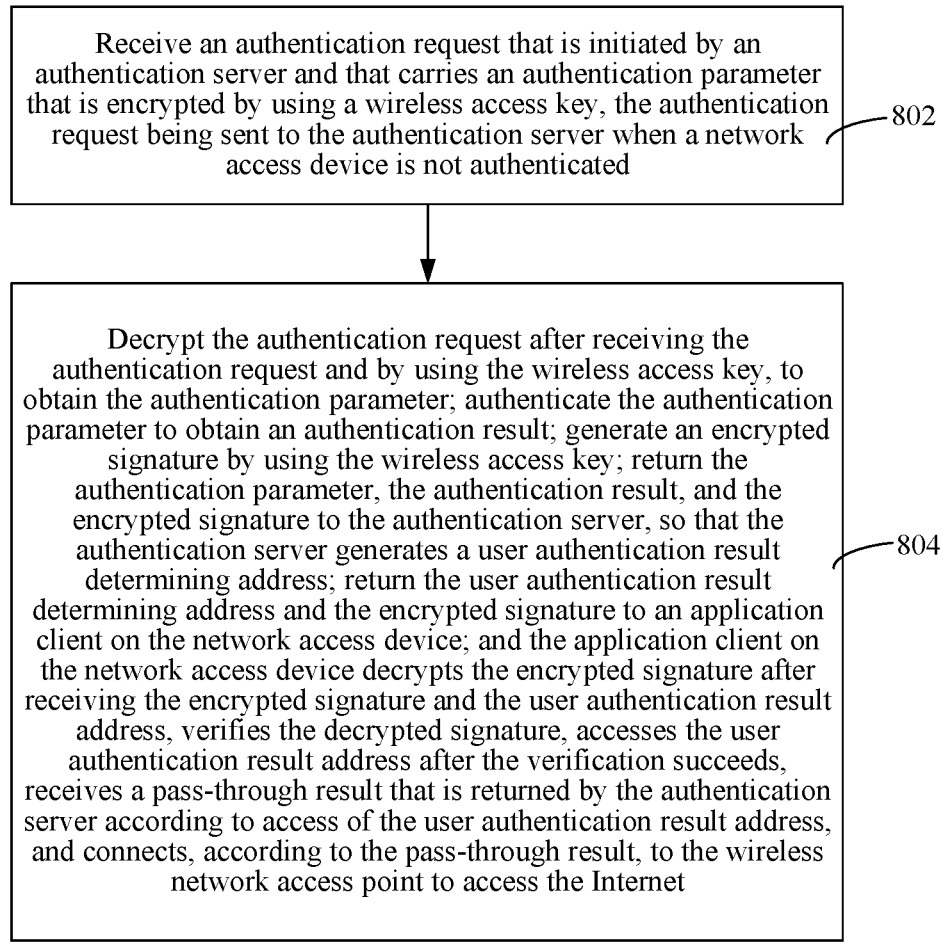
FIG. 8 is a flowchart of a method for connecting a network access device to a wireless network access point according to another embodiment.

FIG. 8 is a flowchart of a method for connecting a network access device to a wireless network access point according to another embodiment. As shown in FIG. 8, a method for connecting a network access device to a wireless network access point is described from the perspective of an application server. For details that are not described, refer to the description of the method for connecting a network access device to a wireless network access point in FIG. 4. The method includes the following blocks:

Block 802: Receive an authentication request that is initiated by an authentication server and that carries an authentication parameter that is encrypted by using a wireless access key, the authentication request being sent to the authentication server when a network access device is not authenticated.

Block 804: Decrypt the authentication request after receiving the authentication request and by using the wireless access key, to obtain the authentication parameter; authenticate the authentication parameter to obtain an authentication result; generate an encrypted signature by using the wireless access key; return the authentication parameter, the authentication result, and the encrypted signature to the authentication server, so that the authentication server generates a user authentication result determining address; return the user authentication result determining address and the encrypted signature to an application client on the network access device; and the application client on the network access device decrypts the encrypted signature after receiving the encrypted signature and the user authentication result address, verifies the decrypted signature, accesses the user authentication result address after the verification succeeds, receives a pass-through result that is returned by the authentication server according to access of the user authentication result address, and connects, according to the pass-through result, to a wireless network access point to access the Internet.

The authentication parameter includes hardware parameter information and a user identifier, where the hardware parameter information includes an equipment identifier of the network access device and an equipment identifier of the wireless network access point.

The block of generating an encrypted signature by using the wireless access key includes: generating the encrypted signature by using the wireless access key and the user identifier, or generating the encrypted signature by using the wireless access key, the user identifier, and a time stamp.

According to the foregoing method for connecting a network access device to a wireless network access point, when a network access device is not authenticated, the network access device initiates an authentication request to an authentication server after encrypting an authentication parameter by using a wireless access key. Then the authentication server sends the authentication request carrying the encrypted authentication parameter to an application server. The application server performs decryption to obtain the authentication parameter. The authentication parameter is transmitted in a ciphertext manner in a transmission process, thereby improving security of data transmission. The application server generates an encrypted signature by using the wireless access key, and returns the encrypted signature and an authentication result on the authentication parameter to the authentication server. The authentication server sends the encrypted signature, the authentication result, and the generated user authentication result determining address to the network access device. The network access device verifies the encrypted signature. If the verification succeeds, it indicates that authentication on the application server succeeds. Then the user authentication result determining address is accessed. An application client and the application server are separately verified, thereby improving security. The application client accesses the user authentication result determining address. The authentication server further authenticates the application client. In this way, triple verifications are used, thereby ensuring security.

In an embodiment, the connecting, by the network access device, to the wireless network access point further includes: periodically updating the wireless access key, and sending the updated new wireless access key to the application client on the network access device.

Further, the block of periodically updating the wireless access key, and sending the updated new wireless access key to the application client on the network access device includes: periodically performing updating to generate the new wireless access key, and backing up the original wireless access key; encrypting the new wireless access key by using the original wireless access key, and sending an update request including the encrypted new wireless access key to the application client on the network access device.

In addition, when the application server does not completely finish updating, it is ensured that the new wireless access key and the original wireless access key may be compatibly used, thereby ensuring a normal service.

Security may be improved by periodically updating the wireless access key and preventing the wireless access key from being given away.

Figure 9:
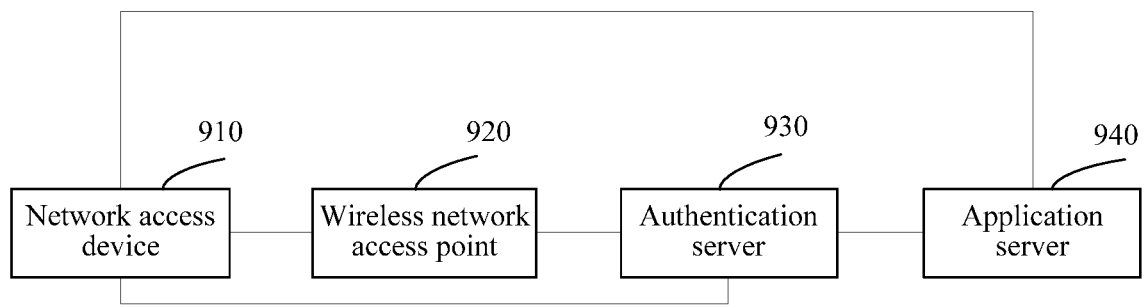
FIG. 9 is a structural block diagram of a system for connecting a network access device to a wireless network access point according to an embodiment.

FIG. 9 is a structural block diagram of a system for connecting a network access device to a wireless network access point according to an embodiment. As shown in FIG. 9, a system for connecting a network access device to a wireless network access point includes: a network access device 910, a wireless network access point 920, an authentication server 930, and an application server 940.

The wireless network access point 920 is configured to: when detecting that the network access device 910 initiating an access request is not authenticated, a wireless network access point redirects the access request to an authentication portal, the access request carrying an authentication server address.

Specifically, the network access device 910 accesses any website after connecting to the wireless network access point. The wireless network access point detects whether the network access device is authenticated. If yes, the network access device may access the website. If the network access device is not authenticated, the wireless network access point redirects the access request to an authentication portal, the access request carrying the authentication server address.

A table is maintained in the wireless network access point, and the table includes information such as a MAC address of the authenticated network access device and a remaining pass-through time mapped by the MAC address. The wireless network access point first queries from the table when there is a network access device connecting to the wireless network access point (for example, a WiFi hotspot). If the MAC address of the network access device is in the table, and the pass-through time does not expire, it is considered that the network access device is authenticated, and the network access device is directly allowed to pass to access the network. Otherwise, it is considered that the network access device is not authenticated. The pass-through time refers to a time that the network access device is allowed to access the Internet by connecting to the wireless network access point.

The redirection of the access request is that a portal may be redirected to by means of HTTP 302, where a hardware parameter and the authentication server address are added to a link of the portal so as to be obtained by an application client. The hardware parameter information includes an equipment identifier of the network access device and an equipment identifier of the wireless network access point. The equipment identifier may be a MAC address, an identification number for representing uniqueness of a device, or the like.

The network access device 910 is configured to: obtain an authentication parameter after obtaining authentication authorization of a user on the authentication portal and by using the application client, encrypt the authentication parameter by using a wireless access key, and initiate, according to the authentication server address, an authentication request carrying the encrypted authentication parameter to the authentication server.

Specifically, the authentication portal is switched to after the access request is redirected to the authentication portal. A reminder interface is displayed on the authentication portal for a user to agree authentication authorization, or an interface of whether to agree to continue authorization authentication is switched to in a process in which the authentication portal directly automatically calls an application program. As shown in FIG. 5, the authentication portal is switched to. A reminder interface is displayed on the authentication portal. The reminder interface displays whether to agree continue authorization authentication, and provides an authorization determining control and an authorization cancellation control.

The authentication parameter may include hardware parameter information and a user identifier. The hardware parameter information includes an equipment identifier of the network access device and an equipment identifier of the wireless network access point. The user identifier is a feature value used to uniquely identify a user identity of an application program, and may be an instant messaging account, an email account, and the like, but is not limited thereto.

The authentication server 930 is configured to send the authentication request carrying the encrypted authentication parameter to the application server 940.

Specifically, the authentication server 930 is further configured to send, in an HTTPS manner, the authentication request carrying the encrypted authentication parameter to the application server 940. Information transmitted by means of HTTPS is secure, and is not easy to maliciously intercept or give away.

The application server 940 is configured to: decrypt the authentication request after receiving the authentication request and by using the wireless access key, to obtain the authentication parameter, authenticate the authentication parameter to obtain an authentication result, generate an encrypted signature by using the wireless access key, and return the authentication parameter, the authentication result, and the encrypted signature to the authentication server 930.

The authentication request is decrypted to obtain the authentication parameter, representing that the authentication request is from a legal application client. The authentication parameter may include hardware parameter information and a user identifier. The user identifier is authenticated, that is, the user identifier is compared with a user identifier stored on the application server. If the two user identifiers are the same, the authentication succeeds. If the two user identifiers are different, the authentication fails. The hardware parameter information is authenticated, that is, the hardware parameter information is compared with hardware parameter information stored on the application server. If the two pieces of hardware parameter information are the same, the authentication succeeds. If the two pieces of hardware parameter information are different, the authentication fails. Alternatively, the user identifier may be only authenticated.

In this embodiment, the encrypted signature is generated by using the wireless access key and the user identifier, or the encrypted signature is generated by using the wireless access key, the user identifier, and a time stamp.

Specifically, the encrypted signature generated by using the wireless access key may be generated by a signature algorithm on which the application server and the application client agree. For example, the application server calculates an md5 value (that is, an encrypted signature) by using a WiFi key (a wireless access key) and a user identifier, and returns the md5 value to the application client on the network access device. The application client also calculates an md5 value (that is, an encrypted signature) by using a WiFi key and a user identifier of the application client. If the md5 value generated by the application server is consistent with the md5 value generated by the application client, the signature is legal, and it indicates that the application server is authenticated. Alternatively, the application server calculates a signature by using a time stamp, a user identifier, and a WiFi key and by using a sha1 algorithm, and simultaneously returns the time stamp and the signature to the application client on the network access device. The application client calculates a signature by using the WiFi key and the user identifier of the application client and the returned time stamp and by using the sha1 algorithm. The signature calculated by the application client is compared with the returned signature. If the signatures are consistent, the signature is legal, and it indicates that the application server is authenticated.

The application server 940 is further configured to send the authentication parameter, the authentication result, and the encrypted signature to the authentication server 930 in an HTTPS manner.

In addition, the application server 940 queries detailed information about a user identity according to the user identifier, and returns the detailed information about the user identity to the authentication server.

The authentication server 930 is further configured to: receive the authentication parameter, the authentication result, and the encrypted signature, generate a user authentication result determining address, and return the user authentication result determining address and the encrypted signature to the application client on the network access device.

Specifically, after receiving the authentication parameter, the authentication server 930 may authenticate the hardware parameter information in the authentication parameter, and compares the equipment identifier of the wireless network access point with the equipment identifier of the wireless network access point that is stored on the authentication server. If the two equipment identifiers are the same, authentication on the wireless network access point succeeds. If the two equipment identifiers are different, authentication on the wireless network access point fails.

After receiving the authentication result, the authentication server 930 synchronously generates a user authentication result determining address (a login address). It is determined, by using the user authentication result determining address, that the authentication request received by the authentication server is from a legal application client. Moreover, the user authentication result address is one-time effective, and cannot be maliciously intercepted for use.

The network access device 910 is further configured to: decrypt the encrypted signature after receiving the encrypted signature and the user authentication result address and by using the application client, verify the decrypted signature, access the user authentication result address after the verification succeeds, receive a pass-through result that is returned by the authentication server according to access of the user authentication result address, and connect, according to the pass-through result, to the wireless network access point to access the Internet.

Specifically, after receiving the encrypted signature, the application client decrypts the encrypted signature to obtain the signature. The encrypted signature may be generated by using the wireless access key and the user identifier, or the encrypted signature may be generated by using the wireless access key, the user identifier, and the time stamp. The foregoing manner may be used. For example, the application client generates an md5 value by using the wireless access key and the user identifier, and compares the md5 value with an md5 value that is returned by the application server and that is generated according to the wireless access key and the user identifier. If the two md5 values are the same, verification on the signature succeeds.

The pass-through result is whether passing through succeeds. If the passing through succeeds, the network access device is allowed to connect to the wireless network access point to normally access the Internet.

In addition, the authentication server returns a pass-through time to the wireless network access device after learning that the network access device accesses the user authentication result address. The pass-through time refers to a time that the network access device is allowed to access the Internet by connecting to the wireless network access point. In this way, the quantity of people surfing the Internet at the same time may be limited, and the Internet traffic is properly distributed.

According to the foregoing system for connecting a network access device to a wireless network access point, when a network access device is not authenticated, the network access device initiates an authentication request to an authentication server after encrypting an authentication parameter by using a wireless access key. Then the authentication server sends the authentication request carrying the encrypted authentication parameter to an application server. The application server performs decryption to obtain the authentication parameter. The authentication parameter is transmitted in a ciphertext manner in a transmission process, thereby improving security of data transmission. The application server generates an encrypted signature by using the wireless access key, and returns the encrypted signature and an authentication result on the authentication parameter to the authentication server. The authentication server sends the encrypted signature, the authentication result, and the generated user authentication result determining address to the network access device. The network access device verifies the encrypted signature. If the verification succeeds, it indicates that authentication on the application server succeeds. Then the user authentication result determining address is accessed. An application client and the application server are separately verified, thereby improving security. The application client accesses the user authentication result determining address. The authentication server further authenticates the application client. In this way, triple verifications are used, thereby ensuring security.

In an embodiment, the application server 940 is further configured to: periodically update the wireless access key, and send the updated wireless access key to the application client on the network access device to update the wireless access key on the application client on the network access device.

Further, the application server 940 is further configured to: periodically update the new wireless access key, back up the original wireless access key, encrypt the new wireless access key by using the original wireless access key, and send an update request including the encrypted new wireless access key to the application client on the network access device.

The application client on the network access device decrypts the update request after receiving the update request and by using the original wireless access key, to obtain the new wireless access key, and replaces the original wireless access key by the new wireless access key.

In addition, when the application server does not completely finish updating, it is ensured that the new wireless access key and the original wireless access key may be compatibly used, thereby ensuring a normal service.

Security may be improved by periodically updating the wireless access key and preventing the wireless access key from being given away.

Figure 10:
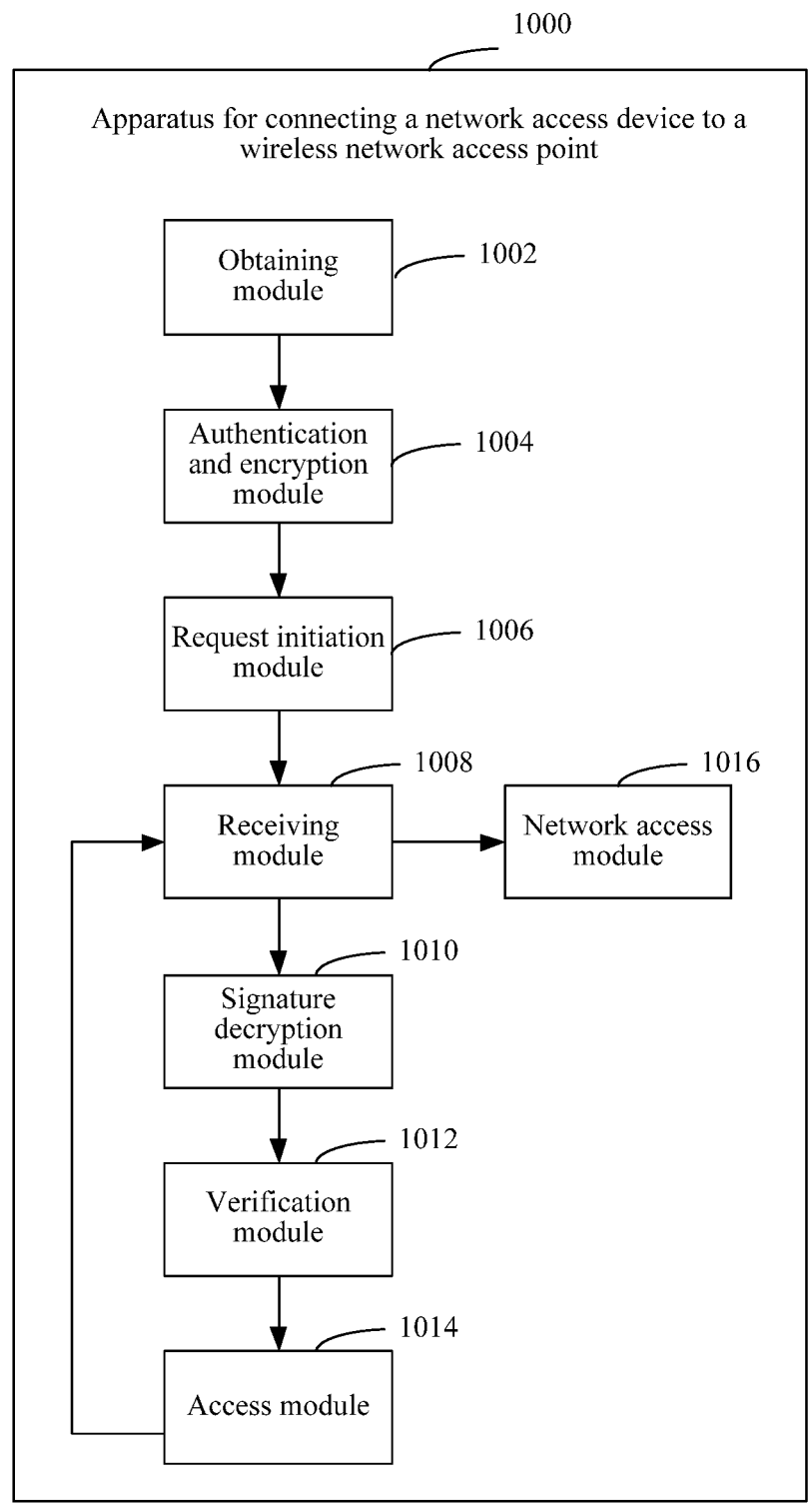
FIG. 10 is a structural block diagram of an apparatus for connecting a network access device to a wireless network access point according to an embodiment.

FIG. 10 is a structural block diagram of an apparatus for connecting a network access device to a wireless network access point according to an embodiment. As shown in FIG. 10, an apparatus 1000 for connecting a network access device to a wireless network access point is located in a network access device, and includes: an obtaining module 1002, an authentication and encryption module 1004, a request initiation module 1006, a receiving module 1008, a signature decryption module 1010, a verification module 1012, an access module 1014, and a network access module 1016.

The obtaining module 1002 is configured to obtain an authentication parameter after a wireless network access point detects that the network access device is not authenticated.

Specifically, the network access device accesses any website after connecting to the wireless network access point. The wireless network access point detects whether the network access device is authenticated. If yes, the network access device may access the website. If the network access device is not authenticated, the wireless network access point redirects an access request to an authentication portal, the access request carrying an authentication server address.

A table is maintained in the wireless network access point, and the table includes information such as a MAC address of the authenticated network access device and a remaining pass-through time mapped by the MAC address. The wireless network access point first queries from the table when there is a network access device connecting to the wireless network access point (for example, a WiFi hotspot). If the MAC address of the network access device is in the table, and the pass-through time does not expire, it is considered that the network access device is authenticated, and the network access device is directly allowed to pass to access the network. Otherwise, it is considered that the network access device is not authenticated. The pass-through time refers to a time that the network access device is allowed to access the Internet by connecting to the wireless network access point.

After the wireless network access point detects that the network access device is not authenticated, the access request of the network access device is redirected to the authentication portal to switch to the authentication portal. A reminder interface is displayed on the authentication portal for a user to agree authentication authorization, or an interface of whether to agree to continue authorization authentication is switched to in a process in which the authentication portal directly automatically calls an application program. The authentication parameter is obtained after authentication authorization of the user on the authentication portal is obtained.

The authentication parameter may include hardware parameter information and a user identifier. The hardware parameter information includes an equipment identifier of the network access device and an equipment identifier of the wireless network access point. The user identifier is a feature value used to uniquely identify a user identity of an application program, and may be an instant messaging account, an email account, and the like, but is not limited thereto.

The authentication and encryption module 1004 is configured to encrypt the authentication parameter by using a wireless access key.

The request initiation module 1006 is configured to initiate, to an authentication server according to an authentication server address in an access request that is redirected when the network access device is not authenticated, an authentication request carrying the authentication parameter that is encrypted by using the wireless access key.

The receiving module 1008 is configured to receive an encrypted signature and a user authentication result address that are returned by the authentication server, the encrypted signature being generated by using the wireless access key and after an application server decrypts the authentication request carrying the encrypted authentication parameter to obtain the authentication parameter; and the user authentication result address being generated after the authentication server receives the authentication parameter, an authentication result, and the encrypted signature that are sent by the application server.

The signature decryption module 1010 is configured to decrypt the encrypted signature.

The verification module 1012 is configured to verify the decrypted signature.

In this embodiment, the encrypted signature is generated by using the wireless access key and the user identifier, or the encrypted signature is generated by using the wireless access key, the user identifier, and a time stamp.

Specifically, the encrypted signature generated by using the wireless access key may be generated by a signature algorithm on which the application server and the application client agree. For example, the application server calculates an md5 value (that is, an encrypted signature) by using a WiFi key (a wireless access key) and a user identifier, and returns the md5 value to the application client on the network access device. The verification module 1012 also calculates an md5 value (that is, an encrypted signature) by using a WiFi key and a user identifier of the verification module 1012. If the md5 value generated by the application server is consistent with the md5 value generated by the application client (e.g., the verification module 1012), the signature is legal, and it indicates that the application server is authenticated. Alternatively, the application server calculates a signature by using a time stamp, a user identifier, and a WiFi key and by using a sha1 algorithm, and simultaneously returns the time stamp and the signature to the application client on the network access device. The verification module 1012 calculates a signature by using the WiFi key and the user identifier of The verification module 1012 and the returned time stamp and by using the sha1 algorithm. The signature calculated by the application client is compared with the returned signature. If the signatures are consistent, the signature is legal, and it indicates that the application server is authenticated.

The access module 1014 is configured to access the user authentication result address after the verification succeeds.

The receiving module 1008 is further configured to receive a pass-through result that is returned by the authentication server according to access of the user authentication result address.

The network access module 1016 is configured to connect to according to the wireless network access point according to the pass-through result to access the Internet.

The pass-through result is whether passing through succeeds. If the passing through succeeds, the network access device is allowed to connect to the wireless network access point to normally access the Internet.

The receiving module 1008 is further configured to receive a pass-through time that is returned by the authentication server after the authentication server learns that the user authentication result address is accessed.

According to the foregoing apparatus for connecting a network access device to a wireless network access point, when a network access device is not authenticated, the network access device initiates an authentication request to an authentication server after encrypting an authentication parameter by using a wireless access key. Then the authentication server sends the authentication request carrying the encrypted authentication parameter to an application server. The application server performs decryption to obtain the authentication parameter. The authentication parameter is transmitted in a ciphertext manner in a transmission process, thereby improving security of data transmission. The application server generates an encrypted signature by using the wireless access key, and returns the encrypted signature and an authentication result on the authentication parameter to the authentication server. The authentication server sends the encrypted signature, the authentication result, and the generated user authentication result determining address to the network access device. The network access device verifies the encrypted signature. If the verification succeeds, it indicates that authentication on the application server succeeds. Then the user authentication result determining address is accessed. An application client and the application server are separately verified, thereby improving security. The application client accesses the user authentication result determining address. The authentication server further authenticates the application client. In this way, triple verifications are used, thereby ensuring security.

In an embodiment, the receiving module 1008 is further configured to receive the wireless access key updated by the application server.

Figure 11:
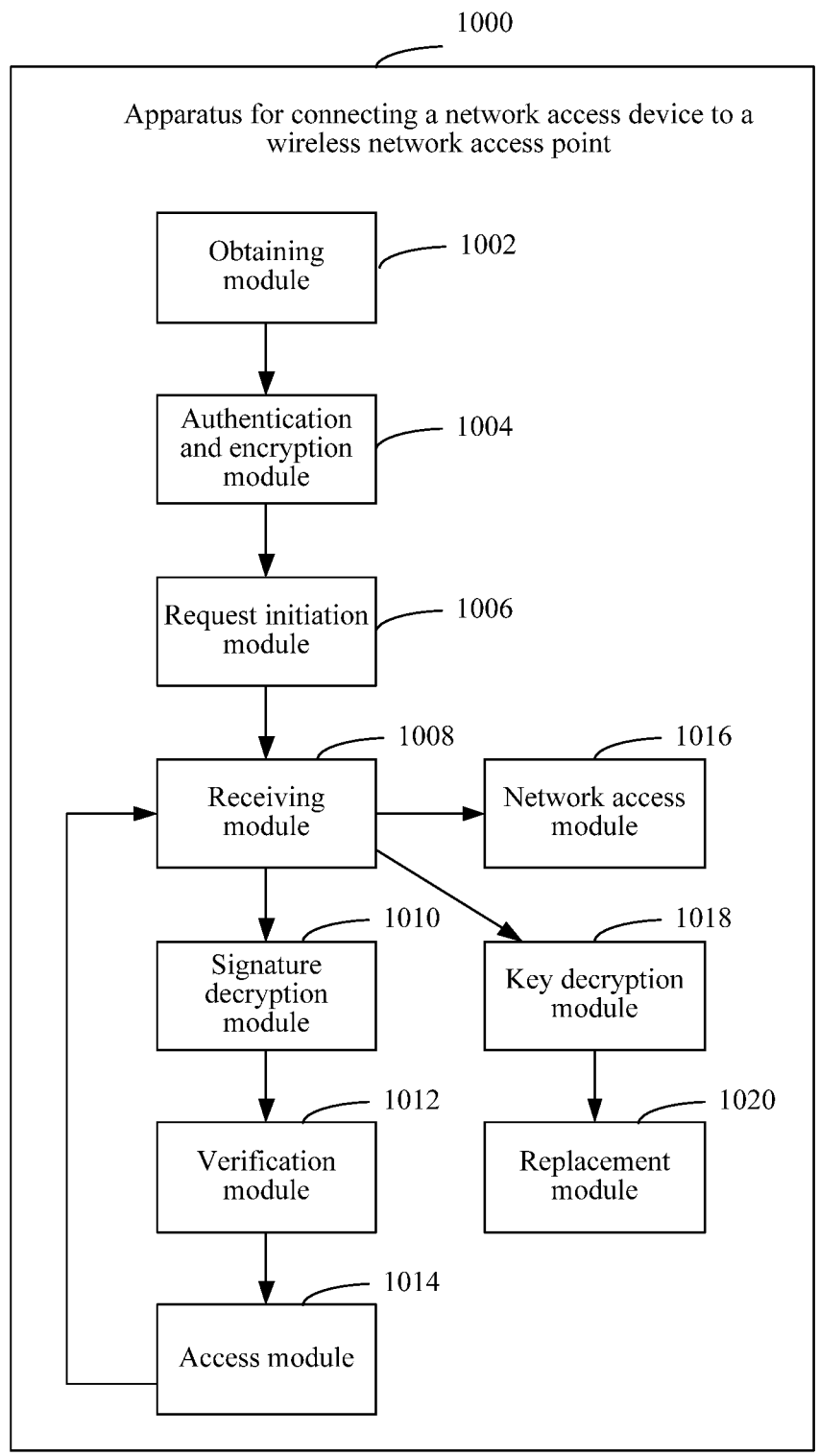
FIG. 11 is a structural block diagram of an apparatus for connecting a network access device to a wireless network access point according to another embodiment.

FIG. 11 is a structural block diagram of an apparatus for connecting a network access device to a wireless network access point according to another embodiment. As shown in FIG. 11, an apparatus 1000 for connecting a network access device to a wireless network access point is located in a network access device, and includes: an obtaining module 1002, an authentication and encryption module 1004, a request initiation module 1006, a receiving module 1008, a signature decryption module 1010, a verification module 1012, an access module 1014, a network access module 1016, a key decryption module 1018, and a replacement module 1020.

The receiving module 1008 is further configured to receive an update request that is sent by an application server and that includes an encrypted new wireless access key, where the new wireless access key is encrypted by using an original wireless access key.

The key decryption module 1018 is further configured to decrypt the update request according to the update request by using the original wireless access key, to obtain the new wireless access key.

The replacement module 1020 is configured to replace the original wireless access key by the new wireless access key.

In addition, when the application server does not completely finish updating, it is ensured that the new wireless access key and the original wireless access key may be compatibly used, thereby ensuring a normal service.

Security may be improved by periodically updating the wireless access key and preventing the wireless access key from being given away.

Figure 12:
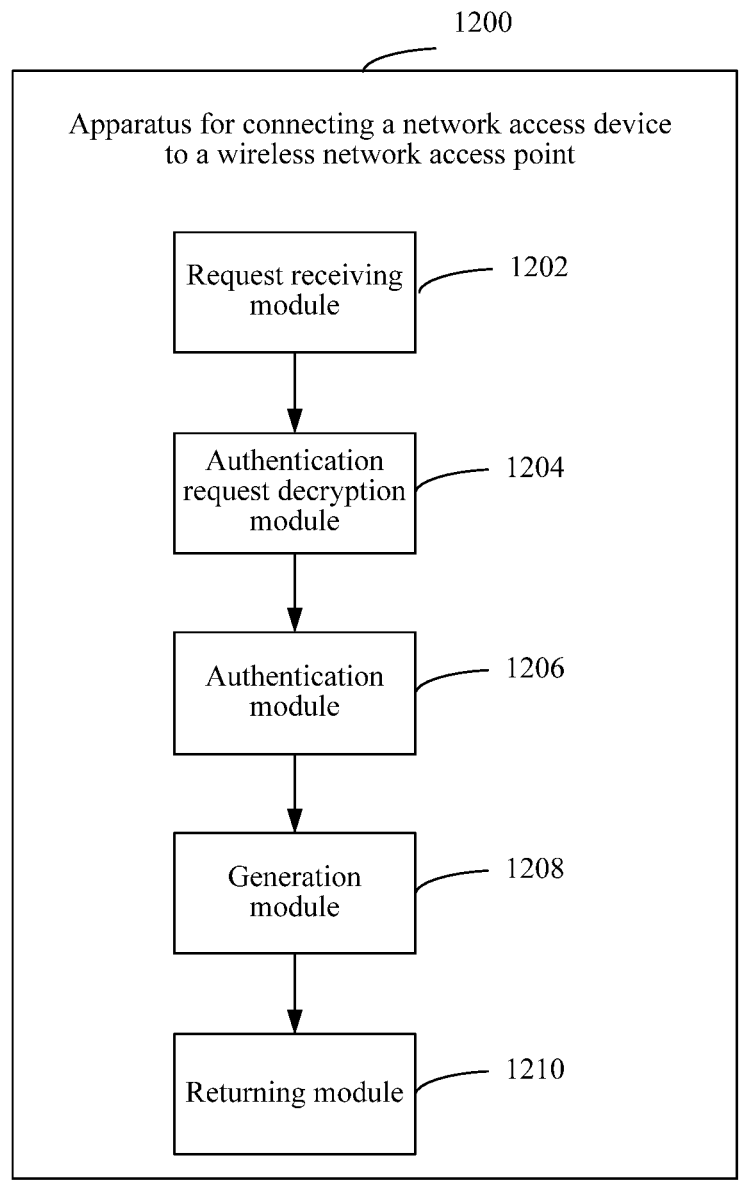
FIG. 12 is a structural block diagram of an apparatus for connecting a network access device to a wireless network access point according to another embodiment.

FIG. 12 is a structural block diagram of an apparatus for connecting a network access device to a wireless network access point according to another embodiment. As shown in FIG. 12, an apparatus 1200 for connecting a network access device to a wireless network access point is located on an application server, and includes: a request receiving module 1202, an authentication request decryption module 1204, an authentication module 1206, a generation module 1208, and a returning module 1210.

The request receiving module 1202 is configured to receive an authentication request that is initiated by an authentication server and that carries an authentication parameter that is encrypted by using a wireless access key, the authentication request being sent to the authentication server when a network access device is not authenticated.

The authentication request decryption module 1204 is configured to decrypt the authentication request after receiving the authentication request and by using the wireless access key, to obtain the authentication parameter.

The authentication module 1206 is configured to authenticate the authentication parameter to obtain an authentication result.

The generation module 1208 is configured to generate an encrypted signature by using the wireless access key. The authentication parameter includes hardware parameter information and a user identifier, where the hardware parameter information includes an equipment identifier of the network access device and an equipment identifier of the wireless network access point.

The generation module 1208 is further configured to: generate the encrypted signature by using the wireless access key and the user identifier, or generate the encrypted signature by using the wireless access key, the user identifier, and the time stamp.

The returning module 1210 is configured to: return the authentication parameter, the authentication result, and the encrypted signature to the authentication server, so that the authentication server generates a user authentication result determining address; return the user authentication result determining address and the encrypted signature to an application client on the network access device; and decrypt the encrypted signature after the application client on the network access device receives the encrypted signature and the user authentication result address, verify the decrypted signature, access the user authentication result address after the verification succeeds, receive a pass-through result that is returned by the authentication server according to access of the user authentication result address, and connect, according to the pass-through result, the wireless network access point to access the Internet.

According to the foregoing apparatus for connecting a network access device to a wireless network access point, when a network access device is not authenticated, the network access device initiates an authentication request to an authentication server after encrypting an authentication parameter by using a wireless access key. Then the authentication server sends the authentication request carrying the encrypted authentication parameter to an application server. The application server performs decryption to obtain the authentication parameter. The authentication parameter is transmitted in a ciphertext manner in a transmission process, thereby improving security of data transmission. The application server generates an encrypted signature by using the wireless access key, and returns the encrypted signature and an authentication result on the authentication parameter to the authentication server. The authentication server sends the encrypted signature, the authentication result, and the generated user authentication result determining address to the network access device. The network access device verifies the encrypted signature. If the verification succeeds, it indicates that authentication on the application server succeeds. Then the user authentication result determining address is accessed. An application client and the application server are separately verified, thereby improving security. The application client accesses the user authentication result determining address. The authentication server further authenticates the application client. In this way, triple verifications are used, thereby ensuring security.

Figure 13:
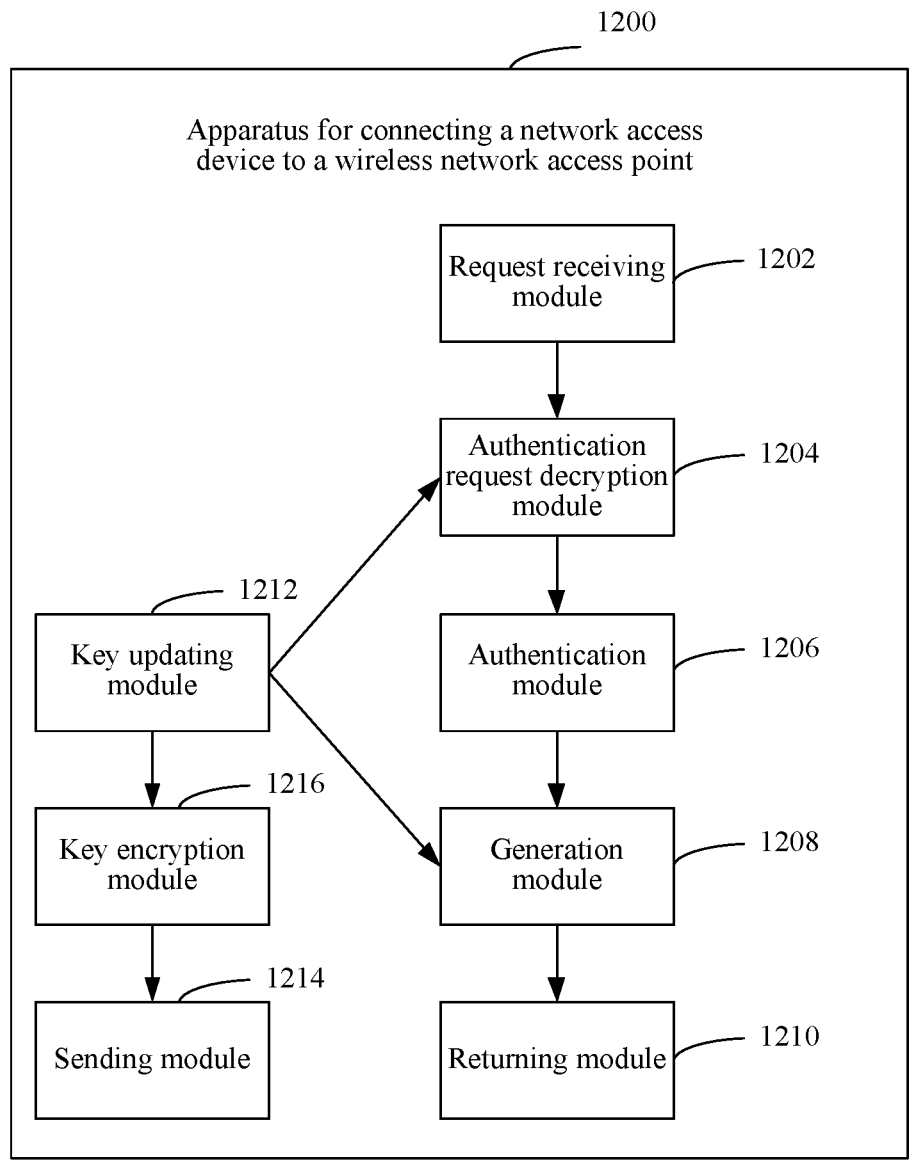
FIG. 13 is a structural block diagram of an apparatus for connecting a network access device to a wireless network access point according to another embodiment.

FIG. 13 is a structural block diagram of an apparatus for connecting a network access device to a wireless network access point according to another embodiment. As shown in FIG. 13, an apparatus 1200 for connecting a network access device to a wireless network access point is located on an application server, and includes: a request receiving module 1202, an authentication request decryption module 1204, an authentication module 1206, a generation module 1208, a returning module 1210, a key updating module 1212, a sending module 1214, and a key encryption module 1216.

The key updating module 1212 is configured to periodically update a wireless access key.

The sending module 1214 is configured to send the updated wireless access key to an application client on a network access device.

Further, the key updating module 1212 is further configured to: periodically perform updating to generate a new wireless access key, and back up the original wireless access key.

The key encryption module 1216 is configured to encrypt the new wireless access key by using the original wireless access key.

The sending module 1214 is further configured to send an update request including the encrypted new wireless access key to the application client on the network access device.

Existing technologies that involve an application server for connecting a smart terminal to an access point have many technical issues. For example, existing process have poor compatibility with WiFi portal approach. Major changes on the access points are needed to achieve the same goal, which is particularly difficult for shops that already installed with access points. Some technology requires user action to initiate connection to an SSID returned by the application server, which demands extra user action and is not user friendly. Some technology transmits authentication information without encryption, which security issues. Further, communication and encryption of the authentication information between the WiFi hotspot (AP) and the authentication server is defined by different WiFi manufacturers. The industry does not have a unified standard, and requires a manufacturer with a higher capacity to develop similar functionalities.

By implementing the disclosed method and/or apparatus, traditional WiFi portal authentication process can be used and is compatible without changing existing AP. With the WiFi portal authentication process, a user does not need to input passwords, and the WiFi connection can be achieved by one-click, which brings good user experience. Authentication information implements a uniform standard and is transmitted with encryption, which increases security level. The wireless access key is periodically updated, which prevents information leakage and ensures security.

A person of ordinary skill in the art may understand that all or some of the procedures of the methods in the foregoing embodiments may be implemented by a computer program instructing relevant hardware. The program may be stored in a non-volatile computer readable storage medium. When the program is executed, procedures of the foregoing method embodiments may be performed. The storage medium may be a magnetic disk, an optical disc, a read-only memory (ROM), or the like.

The embodiments described above are merely some implementations of the present disclosure. The descriptions thereof are relatively specific and detailed. However, it should not be understood as a limitation to the patent scope of the present disclosure. It should be noted that, a person of ordinary skill in the art may further make some variations and improvements without departing from the concept of the present disclosure, and the variations and improvements belong to the protection scope of the present disclosure. Therefore, the protection scope of the present disclosure shall be subject to the protection scope of the appended claims.

What is claimed is:

1. A method for connecting a network access device to a wireless network access point, comprising:
   initiating, by a network access device, an access request to a wireless network access point, wherein when detecting that the network access device is not authenticated, the wireless network access point redirects the access request to an authentication portal, the access request carrying an authentication server address;
   obtaining authentication authorization of a user on the authentication portal;
   obtaining, by an application client on the network access device, an authentication parameter after obtaining the authentication authorization;
   encrypting the authentication parameter by using a wireless access key;
   initiating, according to the authentication server address, an authentication request carrying the encrypted authentication parameter to an authentication server, wherein the authentication server obtains an encrypted signature from an application server that decrypts and validates the authentication parameter by using the wireless access key, and generates a login address;
   receiving, by the application client on the network access device, the login address and the encrypted signature from the authentication server;
   accessing the login address on the authentication server, wherein the authentication server returns a pass-through result; and
   connecting, by the network access device, to the wireless network access point to access the Internet according to the pass-through result.

2. The method according to claim 1, further comprising:
   periodically receiving, by the application client on the network access device, an update request comprising an encrypted new wireless access key from the application server, wherein the encrypted new wireless access key is obtained by encrypting a new wireless access key using an original wireless access key;
   decrypting, by the application client on the network access device, the update request by using the original wireless access key, to obtain the new wireless access key; and
   replacing the original wireless access key by the new wireless access key.

3. The method according to claim 1, further comprising:
   connecting to, by the network access device, the network wireless access point to access the Internet based on a pass-through time returned by the authentication server.

4. The method according to claim 1, wherein the authentication parameter comprises hardware parameter information and a user identifier, wherein the hardware parameter information comprises an equipment identifier of the network access device and an equipment identifier of the wireless network access point; and
   the encrypted signature is generated by using the wireless access key and the user identifier, or by using the wireless access key, the user identifier, and a time stamp.

5. The method according to claim 1, wherein accessing the login address further comprises:
   decrypting the encrypted signature by using the wireless access key to obtain a decrypted signature;
   performing a verification of the decrypted signature; and
   accessing the login address on the authentication server after the verification succeeds.

6. The method according to claim 1, wherein the authentication authorization on the authentication portal is obtained in response to a single user action.

7. A method for connecting a network access device to a wireless network access point, comprising:
receiving, by an application server, an authentication request from an authentication server, wherein the authentication request carries an authentication parameter encrypted by an application client on a network device using a wireless access key, and is sent to the authentication server when the network access device is not authenticated;
decrypting, by the application server, the authentication request by using the wireless access key, to obtain the authentication parameter;
verifying the authentication parameter to obtain an authentication result;
after determining that the authentication result is successful, generating an encrypted signature by using the wireless access key; and
returning the authentication parameter, the authentication result, and the encrypted signature to the authentication server, wherein the authentication server generates a login address, and sends the encrypted signature and the login address to the application client on the network access device; and the application client on the network access device decrypts the encrypted signature, accesses the login address, and connects, according to a pass-through result after accessing the login address, to a wireless network access point to access the Internet.

8. The method according to claim 7, further comprising:
periodically generating a new wireless access key, and backing up an original wireless access key;
encrypting the new wireless access key by using the original wireless access key to obtain an encrypted new wireless access key; and
sending an update request comprising the encrypted new wireless access key to the application client on the network access device.

9. The method according to claim 7, wherein the authentication parameter comprises hardware parameter information and a user identifier, wherein the hardware parameter information comprises an equipment identifier of the network access device and an equipment identifier of the wireless network access point; and
the generating an encrypted signature by using the wireless access key comprises:
generating the encrypted signature by using the wireless access key and the user identifier, or generating the encrypted signature by using the wireless access key, the user identifier, and a time stamp.

10. A network access device, comprising a memory and a processor, the memory computer readable instructions, wherein when executing the instructions, the processor is configured for:
initiating an access request to a wireless network access point, wherein when detecting that the network access device is not authenticated, the wireless network access point redirects the access request to an authentication portal, the access request carrying an authentication server address;
obtaining, by an application client on the network access device, authentication authorization of a user on the authentication portal;
obtaining an authentication parameter after obtaining the authentication authorization;
encrypting the authentication parameter by using a wireless access key;
initiating, to an authentication server according to an authentication server address, an authentication request carrying the encrypted authentication parameter, wherein the authentication server obtains an encrypted signature from an application server that decrypts and validates the authentication parameter by using the wireless access key, and generates a login address;
receiving the encrypted signature and a login address from the authentication server;
decrypting the encrypted signature by using the wireless access key to obtain a decrypted signature for verification;
accessing the login address after the verification succeeds, wherein the authentication server returns a pass-through result; and
connecting, according to the pass-through result, to the wireless network access point to access the Internet.

11. The network access device according to claim 10, wherein, the processor is further configured for:
periodically receiving, by the application client on the network access device, an update request from the application server, the update request comprising an encrypted new wireless access key, wherein the encrypted new wireless access key is obtained by encrypting a new wireless access key using an original wireless access key; and
decrypting, by the application client on the network access device, the update request by using the original wireless access key, to obtain the new wireless access key; and
replacing the original wireless access key by the new wireless access key.

12. The network access device according to claim 10, wherein, the processor is further configured for:
receiving the pass-through time returned by the authentication server after the authentication server learns that the login address is accessed.

13. The network access device according to claim 10, wherein the processor is further configured for:
connecting to the network wireless access point to access the Internet based on a pass-through time returned by the authentication server.

14. The network access device according to claim 10, wherein the authentication authorization on the authentication portal is obtained in response to a single user action.

15. The network access device according to claim 10, wherein, the authentication parameter comprises hardware parameter information and a user identifier, wherein the hardware parameter information comprises an equipment identifier of the network access device and an equipment identifier of the wireless network access point; and
the encrypted signature is generated by using the wireless access key and the user identifier, or by using the wireless access key, the user identifier, and a time stamp.

16. An application server, comprising a memory and a processor, the memory storing a computer readable instruction to be executed by the processor, wherein the processor is configured for:
receiving an authentication request from an authentication server, wherein the authentication request carries an authentication parameter encrypted by an application client on a network device using a wireless access key, and is sent to the authentication server when the network access device is not authenticated;

decrypting the authentication request by using the wireless access key, to obtain the authentication parameter;

verifying the authentication parameter to obtain an authentication result;

after determining that the authentication result is successful, generating an encrypted signature by using the wireless access key; and returning the authentication parameter, the authentication result, and the encrypted signature to the authentication server, wherein the authentication server generates a login address, and sends the encrypted signature and the login address to the application client on the network access device; and the application client on the network access device decrypts the encrypted signature, accesses the login address, and connects, according to a pass-through result after accessing the login address, a wireless network access point to access the Internet.

17. The application server according to claim 16, wherein the processor is further configured for:

periodically generating a new wireless access key, and backing up an original wireless access key;

encrypting the new wireless access key by using the original wireless access key to obtain an encrypted new wireless access key; and sending an update request comprising the encrypted new wireless access key to the application client on the network access device.

18. The application server according to claim 16, wherein the authentication parameter comprises hardware parameter information and a user identifier, wherein the hardware parameter information comprises an equipment identifier of the network access device and an equipment identifier of the wireless network access point; and the generating an encrypted signature by using the wireless access key comprises:

generating the encrypted signature by using the wireless access key and the user identifier, or generating the encrypted signature by using the wireless access key, the user identifier, and a time stamp.

* * * * *